(12) United States Patent
Baughman et al.

(10) Patent No.: US 11,568,612 B2
(45) Date of Patent: Jan. 31, 2023

(54) PERSONALIZED REACTIVE AUGMENTED REALITY ASSOCIATION

(71) Applicant: INTERNATIONAL BUSINESS MACHINES CORPORATION, Armonk, NY (US)

(72) Inventors: Aaron K. Baughman, Cary, NC (US); Shikhar Kwatra, San Jose, CA (US); Vijay Ekambaram, Chennai (IN); Hemant Kumar Sivaswamy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 17/341,533

(22) Filed: Jun. 8, 2021

(65) Prior Publication Data
US 2022/0392171 A1    Dec. 8, 2022

(51) Int. Cl.
*G06T 19/00* (2011.01)
*G06T 13/00* (2011.01)
(Continued)

(52) U.S. Cl.
CPC .......... *G06T 19/006* (2013.01); *G06F 16/248* (2019.01); *G06F 16/24575* (2019.01);
(Continued)

(58) Field of Classification Search
None
See application file for complete search history.

(56) References Cited

U.S. PATENT DOCUMENTS

| 7,735,013 B2* | 6/2010 | Shaouy | G06F 16/9535 715/744 |
| 8,217,759 B2* | 7/2012 | Tessier | G06Q 10/06 340/572.1 |

(Continued)

FOREIGN PATENT DOCUMENTS

| CN | 103366610 | 10/2013 |
| CN | 109828666 | 5/2019 |

OTHER PUBLICATIONS

Mell et al., "The NIST Definition of Cloud Computing", NIST, Special Publication 800-145, Sep. 2011, 7 pages.
(Continued)

*Primary Examiner* — Tapas Mazumder
(74) *Attorney, Agent, or Firm* — Gilbert Harmon; Andrew D. Wright; Calderon Safran & Cole, P.C.

(57) ABSTRACT

A method includes: determining, by the computing device, an activity associated with a physical object in a physical environment, the physical object being a physical object about which a user lacks knowledge; retrieving, by the computing device and from a digital library, a digital object that is associated with the activity; personalizing, by the computing device, the digital object, the personalizing being based on feedback from prior interactions of the user with the digital object; generating, by the computing device, an augmented reality activity including the determined activity, the augmented reality activity comprising a reactive association between the personalized digital object and the physical object; and generating, by the computing device, an augmented reality animation that comprises the augmented reality activity, the physical object, and the personalized digital object.

20 Claims, 10 Drawing Sheets

(51) Int. Cl.
G06F 16/248 (2019.01)
G09B 9/00 (2006.01)
G06F 16/2457 (2019.01)
G06V 20/20 (2022.01)

(52) U.S. Cl.
CPC ............ G06T 13/00 (2013.01); G09B 9/00 (2013.01); G06V 20/20 (2022.01)

(56) References Cited

U.S. PATENT DOCUMENTS

| | | | |
|---|---|---|---|
| 9,361,730 | B2 | 6/2016 | Keating et al. |
| 2013/0324241 | A1 | 12/2013 | Elliott |
| 2014/0028713 | A1 | 1/2014 | Keating et al. |
| 2015/0070388 | A1* | 3/2015 | Sheaffer ............... G02B 27/017 345/633 |
| 2016/0049095 | A1 | 2/2016 | Yannier et al. |
| 2017/0308753 | A1* | 10/2017 | Wu ........................ G06V 20/47 |
| 2019/0371071 | A1 | 12/2019 | Lyons |
| 2020/0401297 | A1* | 12/2020 | Tapadia ............. G06F 3/04815 |
| 2022/0198744 | A1* | 6/2022 | Komoriya ............ G06V 40/10 |

OTHER PUBLICATIONS

Park et al., "Generating Educational Game Levels with Multistep Deep Convolutional Generative Adversarial Networks", IEEE Xplore, downloaded Feb. 5, 2021, 8 pages.

Hendrys Fabián Tobar Muñoz, "Supporting Technology for Augmented Reality Game-Based Learning", Universitat de Girona; https://dugi-doc.udg.edu/handle/10256/14502, Jun. 15, 2017, 239 pages.

Javier Marco et al., "Evaluating a Tangible Game Video Console for Kids", T. Gross et al. (Eds): Interact 2009, Part I, LNCS 5726, 2009, pp. 141-144.

Yanghua Jin et al., "Towards the Automatic Anime Characters Creation with Generative Adversarial Networks", arXiv:1708.05509v1 [cs.CV], Aug. 18, 2017, 16 pages.

Mark Billinghurst et al., "Tangible Augmented Reality", Third IEEE and ACM International Symposium on Mixed and Augmented Reality, 2008, pp. 172-181.

* cited by examiner

| Object Node | Reactive Node | AR animation |
|---|---|---|
| TV | Remote | TV Playing Content |
| Wood | Fire | Wood Burning |
| Electric Bulb | Electrical Connection | Bulb Glows |
| Writing Board | Marker | Writing Text |
| Node | Node | Animation |
|  | … |  |

PERSONALIZED REACTIVE AUGMENTED REALITY ASSOCIATION

BACKGROUND

Aspects of the present invention relate generally to augmented reality (AR) systems and, more particularly, to personalizing a digital object that is produced in reaction to a particular physical entity.

An augmented reality (AR) animation can include one or more physical objects in a physical environment and one or more digital objects (also referred to as virtual objects, AR objects, mixed reality objects). A user can, through the use of an AR device such as, for example, an AR headset, interact with the digital object. The AR animation shows the digital object, as manipulated by the user, superimposed on the physical environment. In some cases, the physical object can be manipulated by the user to interact with the digital object. For example, a user can pick up and physically move a physical marker to interact with a digital writing board.

SUMMARY

In a first aspect of the invention, there is a computer-implemented method including: determining, by the computing device, an activity associated with a physical object in a physical environment, the physical object being a physical object about which a user lacks knowledge; retrieving, by the computing device and from a digital library, a digital object that is associated with the activity; personalizing, by the computing device, the digital object, the personalizing being based on feedback from prior interactions of the user with the digital object; generating, by the computing device, an augmented reality activity including the determined activity, the augmented reality activity comprising a reactive association between the personalized digital object and the physical object; and generating, by the computing device, an augmented reality animation that comprises the augmented reality activity, the physical object, and the personalized digital object.

In another aspect of the invention, there is a computer program product including one or more computer readable storage media having program instructions collectively stored on the one or more computer readable storage media. The program instructions are executable to: determine an activity associated with a physical object in a physical environment, the physical object being a physical object about which a user lacks knowledge; retrieve, from a digital library, a digital object that is associated with the activity; personalize the digital object, the personalizing being based on feedback from prior interactions of the user with the digital object; generate an augmented reality activity including the determined activity, the augmented reality activity comprising a reactive association between the personalized digital object and the physical object; and generate an augmented reality animation that comprises the augmented reality activity, the physical object, and the personalized digital object.

In another aspect of the invention, there is system including a processor, a computer readable memory, one or more computer readable storage media, and program instructions collectively stored on the one or more computer readable storage media. The program instructions are executable to: determine an activity associated with a physical object in a physical environment, the physical object being a physical object about which a user lacks knowledge; retrieve, from a digital library, a digital object that is associated with the activity; personalize the digital object, the personalizing being based on feedback from prior interactions of the user with the digital object; generate an augmented reality activity including the determined activity, the augmented reality activity comprising a reactive association between the personalized digital object and the physical object; and generate an augmented reality animation that comprises the augmented reality activity, the physical object, and the personalized digital object.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
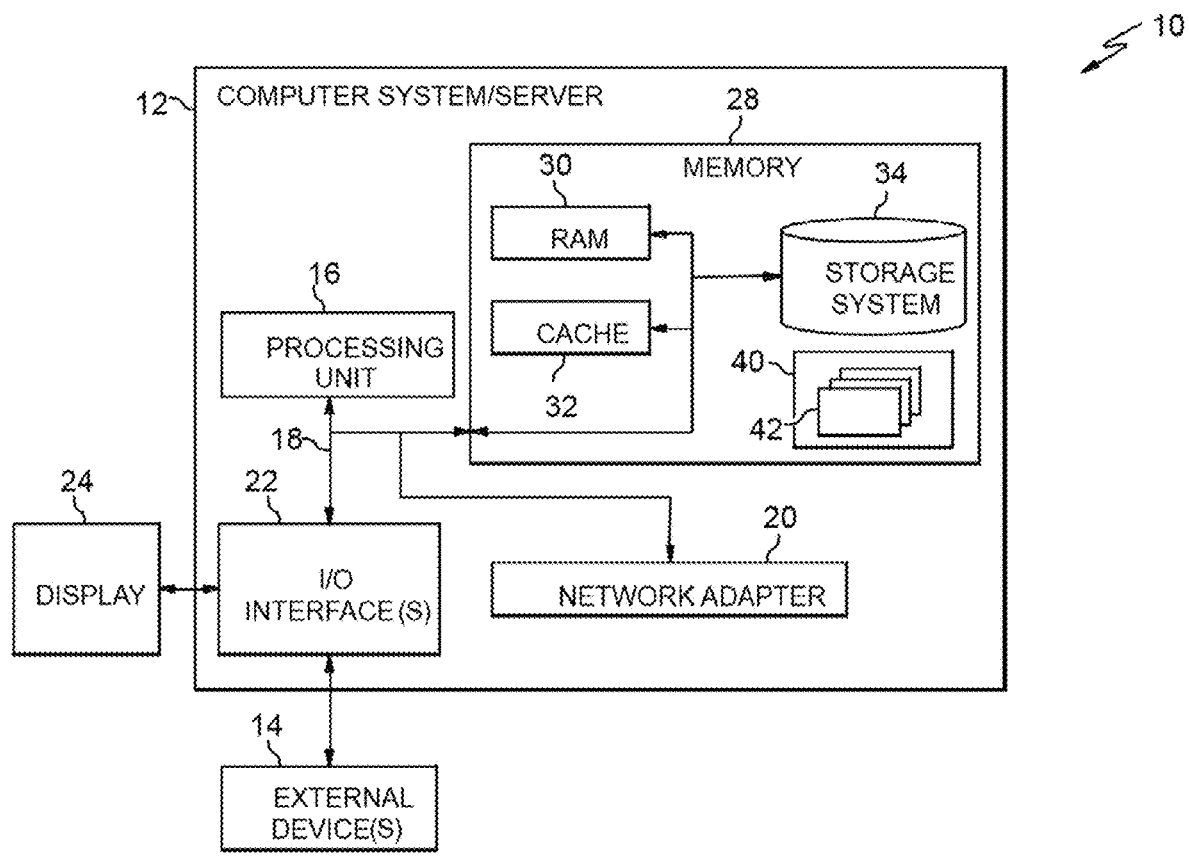
FIG. 1 depicts a cloud computing node according to an embodiment of the present invention.

Aspects of the present invention relate generally to augmented reality (AR) systems and, more particularly, to personalizing a digital object that is produced in reaction to a particular physical entity. According to aspects of the invention, an AR teaching system personalizes the selection of digital objects for a particular user. In embodiments, the personalization is based on feedback from prior interactions of the user with the digital objects. In this manner, implementations of the invention provide a more personalized learning experience using digital objects that are associated with physical objects in an AR environment.

Embodiments predict possible attributes of AR, or mixed reality, objects for personalized reactive associations with the object in a physical space. Embodiments include discovering the labels of various physical objects in the user's surrounding using computer vision based object recognition or Internet of Things (IoT) sensor tag detection techniques and discovering a game/activity for each detected physical object (or "label"). In embodiments, discovering the game/activity includes: discovering related physical objects having unique reactive association with the subject physical object using a word-web; filtering out the physical objects which the user knows using a learner model; creating a gaming activity for the user such that each reactive association between a related physical object and the subject physical object is realized; retrieving digital objects for every related physical object from an AR-Library and randomly positioning them in the area around the associated related physical object; retrieving digital objects for the subject physical object from an AR-Library and overlaying them on top of the physical objects; and retrieving AR animations for every discovered reactive association. Embodiments include launching the associated activity in an AR device of the user for one or more, or every, physical object when the user is in proximity of that physical object by: starting a gaming activity with the user to realize various relations across the digital objects associated with the subject physical object and the digital objects associated with the related physical objects; monitoring the user's actions and reactions to the digital objects in order to determine positive/negative affinity for the digital objects; and in response to a correct realization happening, showing the associated AR animation in digital space.

It should be understood that, to the extent implementations of the invention collect, store, or employ personal information provided by, or obtained from, individuals (for example, information related to the physical objects), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Embodiments of the invention create AR interactions between the real world and a virtual world based on personalized reactive associations between objects for effective learning. Embodiments include associative learning based on objects. Users have preferences with respect to what the user wants to hear, learn, or see when it comes to physical entities in space. A user's interest can lead to identifying correlations of digital entities, or objects, that would fit well with physical entities, or objects, based on the reactive association mechanism. Embodiments provide an augmented reality system that imbibes conceptual knowledge within and personalize it based on a user's needs and pattern history.

Systems that render digital objects to fulfill the complete picture with a given physical object in physical space that are not personalized to the particular user often lead to user dissatisfaction. This dissatisfaction can result from the digital object not being the digital object formation that the user intended. For example, if the user has a marker, such a system may generate a rectangular yellow writing board which can help the user write something with the marker. However, the user may prefer a light blue colored writing board when writing with a red colored marker. In this case, personal context and association with the physical object is not considered. Embodiments consider personal preferences in order to render a digital object that is more visually appealing and satisfying for the particular user. For example, this particular user might prefer a square writing board when using a red marker. Embodiments create an AR (or mixed reality (MR)) space based on reactive associations between physical and digital space while considering preferences of a particular user.

Embodiments use one or more generative adversarial networks (GANs) with reinforcement learning (feedback learning) in an AR environment. These embodiments generate one or more digital objects with personalized attributes for improved reactive association learning for the particular physical objects, and thus maximize the user's satisfaction (e.g., via a reward function) pertaining to the attributes of the digital object. Embodiments follow an iterative learning approach wherein reinforcement learning provides a positive/negative feedback to dynamically assist the GAN in creating a new image that is optimal, or more suitable, for a given user.

Embodiments map the discovered personalized attributes of AR space (for improved reactive association learning in close correlation with physical objects) with neural embedding of user physical space and profile. Embodiments transfer the results of this reactive learning to similar users having similar attributes, thereby leading to better generalization of models while requiring less feedback.

Embodiments leverage the above reinforcement learning and mapping to predict possible attributes of digital objects for personalized reactive associations with the digital object in the physical space. This can result in the user being able to correlate physical and digital (virtual) spaces and effectively learn about the physical objects in their surroundings. Embodiments personalize the digital objects in space based on reactions from the user (and/or other similar users) in order to personalize the associations based on pattern history and/or a reward-penalty mechanism. Embodiments discover various attributes of the discovered digital objects using GANs and reinforcement learning, which creates higher personalized appeal for reactive association learning. Embodiments personalize the attributes of digital objects for reactive learning association with the physical objects via deep reinforcement learning and transfer techniques.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
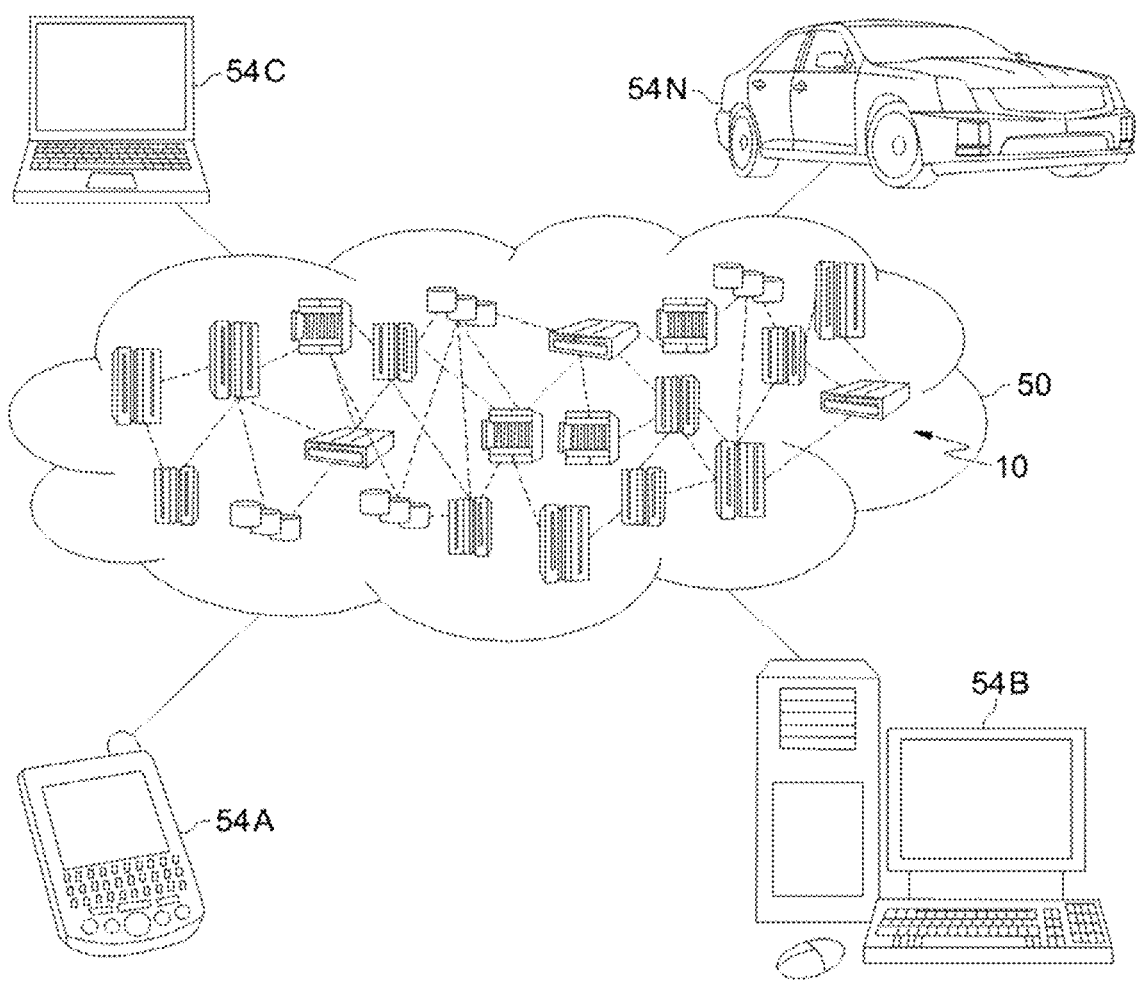
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
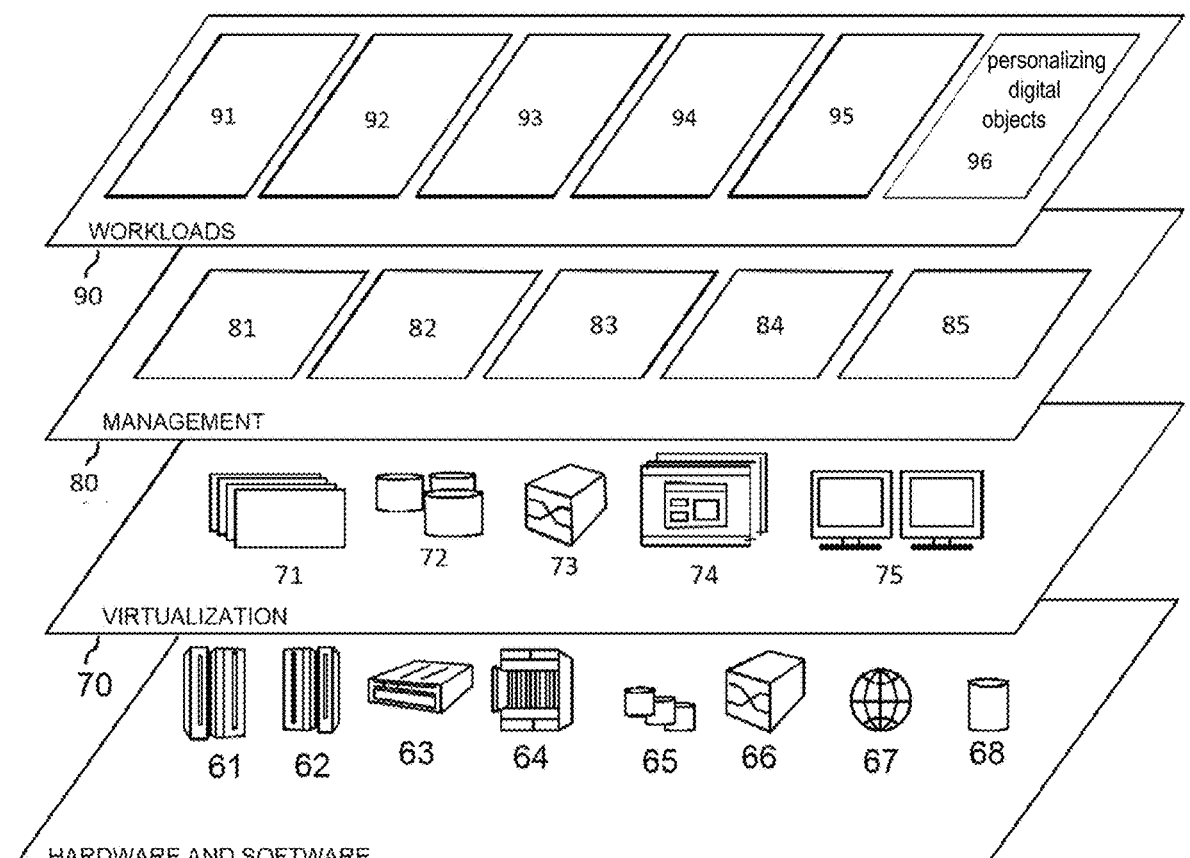
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personalizing digital objects 96.

Implementations of the invention may include a computer system/server 12 of FIG. 1 in which one or more of the program modules 42 are configured to perform (or cause the computer system/server 12 to perform) one of more functions of personalizing digital objects 96 of FIG. 3. For example, the one or more of the program modules 42 may be configured to: determine an activity associated with a physical object in a physical environment, the physical object being a physical object about which a user lacks knowledge; retrieve, from a digital library, a digital object that is associated with the activity; personalize the digital object, the personalizing being based on feedback from prior interactions of the user with the digital object; generate an augmented reality activity including the determined activity, the augmented reality activity comprising a reactive association between the personalized digital object and the physical object; and generate an augmented reality animation that comprises the augmented reality activity, the physical object, and the personalized digital object.

Figure 4:
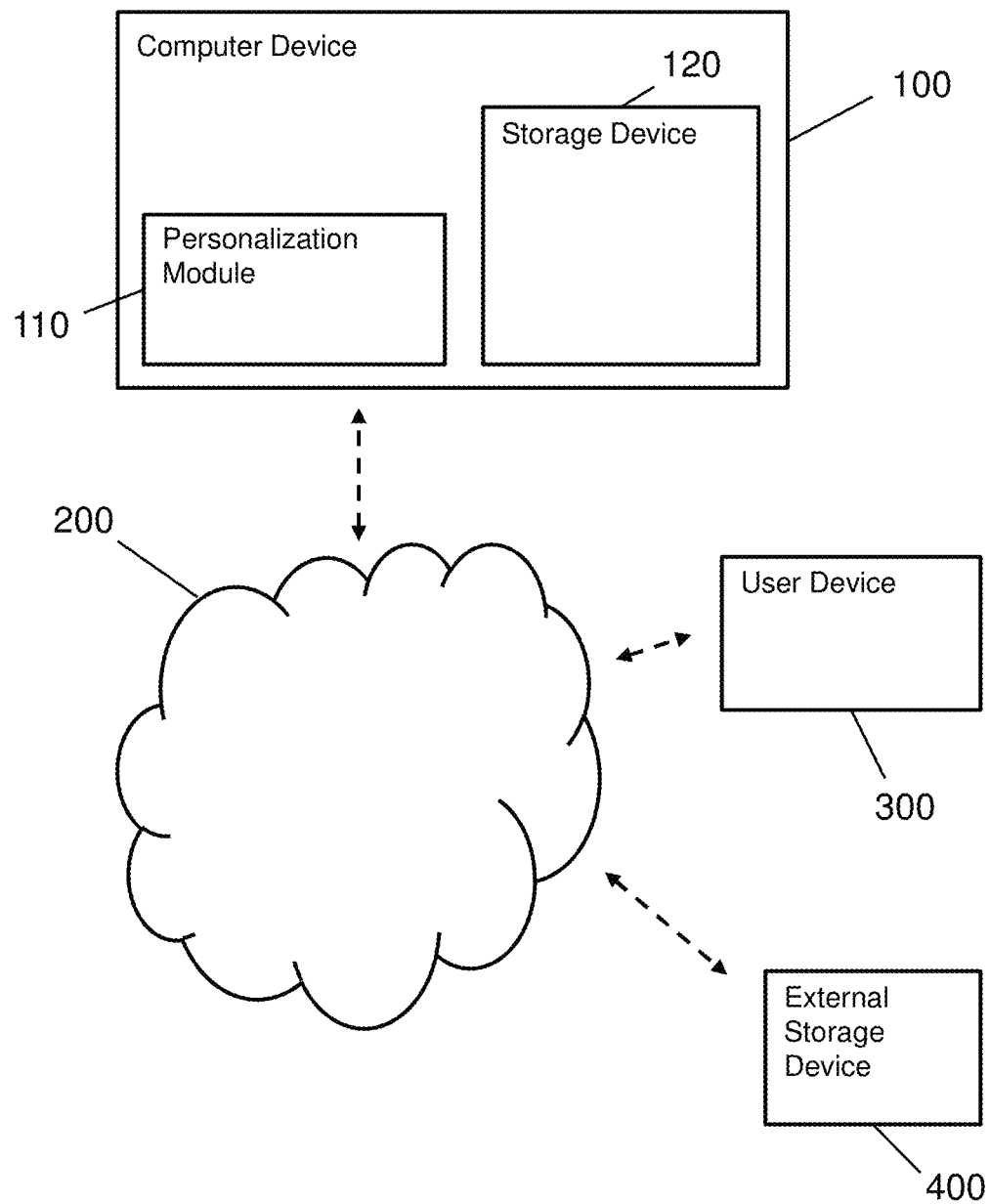
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 200 such as, for example, cloud computing environment 50 of FIG. 2. In this example, computer device 100 includes a personalization module 110, for example, one or more of program modules 42 in FIG. 1, and a storage device 120 such as, for example, storage system 34 in FIG. 1. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

FIG. 4 shows a user device 300 such as, for example, an AR headset, having some or all of the features of computer system/server 12 in FIG. 1, that allows the user to interact with personalization module 110 as described with reference to FIG. 5, below. FIG. 4 also shows an external storage device 400 such as, for example, another computer device having some or all of the features of computer system/server 12 in FIG. 1, that is external to computer device 100 and contains data useful to personalization module 110 such as for example, database 545 shown in FIG. 5. In embodiments, one or more databases, such as for example, database 545 shown in FIG. 5, that are accessed by personalization module 110 are stored on storage device 120. In embodiments, databases accessed by personalization module 110 are contained in storage device 120. In embodiments, databases accessed by personalization module 110 are contained in external storage device 400. In embodiments, some databases accessed by personalization module 110 are contained in storage device 120 and some databases accessed by personalization module 110 are contained in storage device 400.

An example of an application of an embodiment of the invention is a user opening an AR application that runs on and/or accesses computer device 100 and, depending on the user's learner model, chooses words and objects corresponding to the leaner model in the vicinity of the user in a physical space. The system then creates a level-based activity script for teaching the user about the objects. Embodiments personalize the levels and increase the user's learner model score and satisfaction score using self-generated objects such as, for example, playing content on a TV using a digital remote control.

Embodiments predict possible attributes of digital objects for personalized reactive associations with a physical object in the physical space. For example, a user can correlate physical and digital spaces and effectively learn about the physical objects in their surroundings. In embodiments, the personalizing of the digital objects in space is based on reactions from the user and, thus, the associations are personalized based on pattern history and/or a reward-penalty mechanism.

Figure 5:
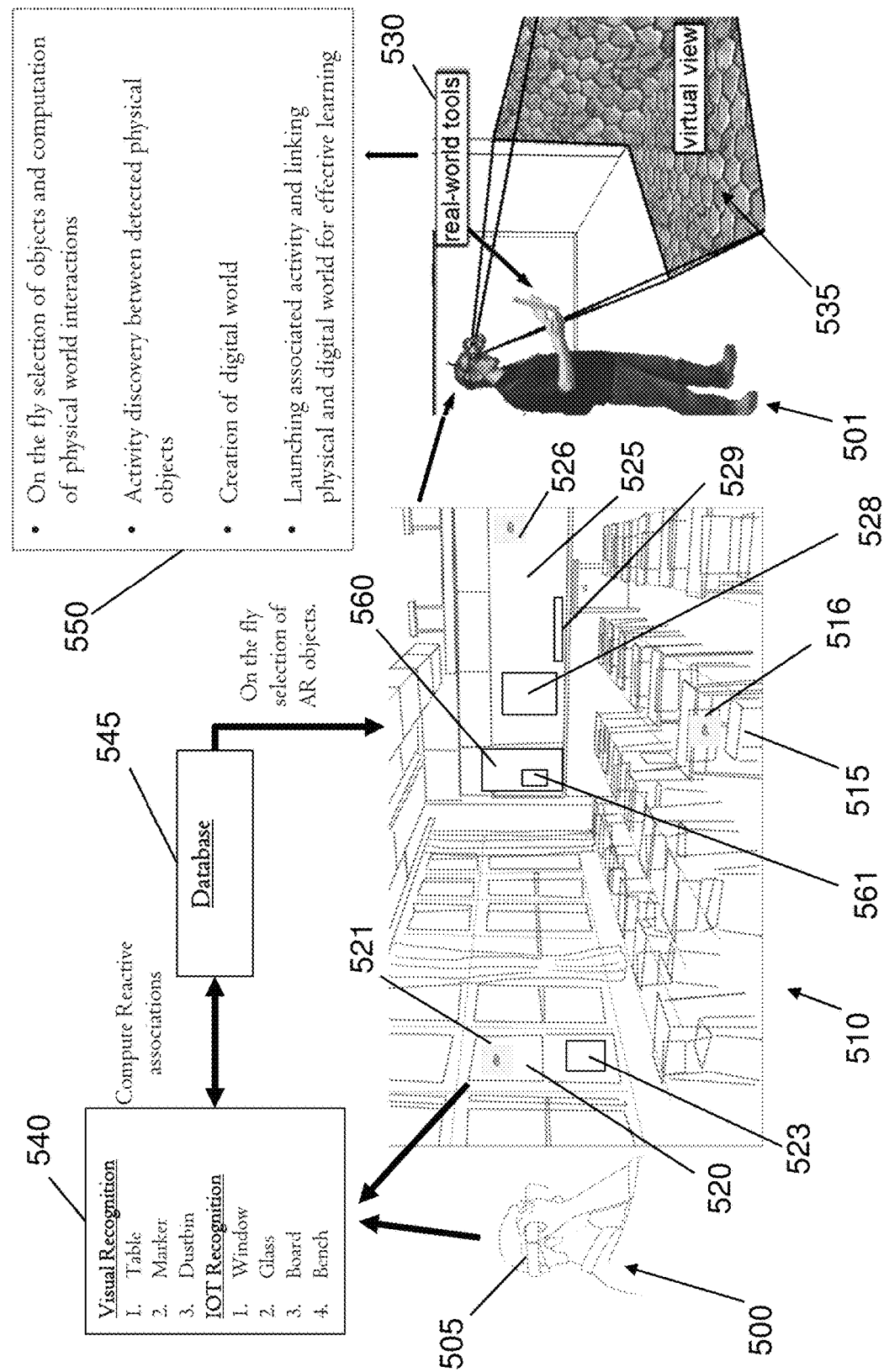
FIG. 5 shows an exemplary environment in accordance with aspects of the invention.

FIG. 5 shows an example of an environment 510, in this case a classroom, in which a user 500 uses an embodiment of the invention to learn about various physical objects in environment 510. In this example, user 500 is wearing an AR headset 505 that comprises the user device 300 of FIG. 4 and, thus, communicates with the computer device 100 of FIG. 4 (not shown again in FIG. 5) via network communication. Examples of physical objects in environment 510 include a bench 515, a glass window 520, and a writing board 525.

Embodiments discover the labels of various physical objects in the user's surroundings, such as environment 510, using computer vision (with, for example, AR headset 505) and/or Internet of Things (IoT) sensor tag detection techniques. For example, an IoT sensor 516 is attached to bench 515, an IoT sensor 521 is attached to glass window 520, and an IoT sensor 526 is attached to writing board 525. In embodiments, AR headset 505 senses the presence of IoT sensors 516, 521 and 526 and communicates their presence to computer device 100 through wireless network 200. In embodiments, personalization module 110 in computer device 100 processes the IoT sensor information and determines therefrom attributes of the associated physical objects (515, 520, 525). In embodiments, AR headset 505 determines attributes of one or more of the physical objects (515, 520, 525) by computer vision recognition of the objects themselves. For example, in embodiments, AR headset 505 determines that writing board 525 is a writing board by processing visual images collected by AR headset 505. In the example shown in FIG. 5, chart 540 shows a table, a marker, and a dustbin/trash can (not shown) are recognized using computer vision, and window 520, the glass in window 520, writing board 525, and bench 515 are recognized using the IoT sensors. Also shown in FIG. 5 is a physical wall calendar 560.

Embodiments determine which of the discovered physical objects in the environment are physical objects about which the user lacks knowledge. In embodiments, this determination is made by comparing the discovered physical objects to a database (such as, for example, database 545 in FIG. 5) to search for prior interactions of the user with the respective discovered physical objects. Embodiments use the information in the database (or lack thereof) to determine if the user has, or does not have, knowledge regarding the respective physical objects and, if so, the level of that knowledge. Embodiments select one or more of the discovered physical objects about which the user lacks knowledge to create an AR activity (discussed below) to teach the user about those objects.

Embodiments discover, in environment 510, one or more related physical objects, the related physical objects having a reactive association with one of the physical objects. In some cases, a particular physical object can have a reactive association with several of the other physical objects. For example, a physical dustbin can be a related to a physical table in that a digital piece of paper can be placed on the physical table, written on with a digital marker and then thrown away in the physical dustbin.

Embodiments determine an activity (such as a game) for each discovered physical object by, for example, discovering and retrieving one or more digital objects (from, for example, database 545 in FIG. 5) that have a reactive association with one of the discovered physical objects. In the example shown in FIG. 5, paper 528 is a digital object that has a reactive association with writing board 525. In the example shown in FIG. 5, personalization module 110 determines digital objects that have reactive associations with the physical objects 515, 520, 525 by, for example, accessing a database (such as, for example database 545) of reactive associations and/or accessing the Internet to find functional relationships between the physical objects and other objects. For example, a digital piece of paper has reactive associations with a physical marker, a physical dustbin, and a physical table. Also, a digital tablet has a reactive association with a physical marker and a physical table. Further, a digital red marker such as, for example, digital marker 529, has a reactive association with a physical writing board such as, for example, writing board 525. Also, a digital shade 523 has a reactive association with a physical window such as, for example, window 520. Further, a digital sticker 561 has a reactive association with physical wall calendar 560.

In determining the activity, embodiments filter out physical objects which are known to the user because the user does not have a need to learn about these objects. Embodiments determine that the user is knowledgeable about a particular physical object based on feedback from prior interactions of the user with that physical object, and refrains from producing an activity, and, therefore from producing an augmented reality activity, associated with that physical object.

Embodiments personalize the digital objects (to create personalized digital objects) based on feedback from prior interactions of the user with the digital objects. For example, a particular user may prefer to use a red marker (as opposed to a blue or other color marker) on a light blue writing board. The system (for example, personalization module 110) determines this preference from data collected from feedback from prior interactions of the user with writing boards. In embodiments, the feedback includes the user selecting a red marker, from a group of available digital markers, for use with a light blue writing board in a previous interaction with a writing board. In embodiments, the feedback includes a prior survey completed by the user. Embodiments generate an augmented reality activity including the determined activity. The augmented reality activity includes one or more of the reactive associations between the personalized digital object(s) and the physical object.

Embodiments retrieve an additional digital object that is associated with the activity and personalize the additional digital object. In embodiments, the personalizing is based on feedback from prior interactions of the user with the additional digital object. FIG. 5 shows digital marker 529 that is an additional digital object that is associated with the activity of writing on writing board 525. Embodiments retrieve an augmented reality sub-animation for a reactive association between the additional personalized digital object and the physical object. In the example shown in FIG. 5, personalization module 110 retrieves an augmented reality sub-animation for a reactive association between marker 529 and writing board 525.

In embodiments, the system (for example, personalization module 110) generates an augmented reality animation that includes the augmented reality activity, the physical object, and the personalized digital object. Some animations include one or more related physical objects and/or a plurality of personalized digital objects. For example, the digital objects (some of which may be personalized) that are associated with the physical object are (through AR) overlaid on top of the physical object. Also, in embodiments, the digital objects (some of which may be personalized) that are associated with the related physical object(s) are randomly positioned (through AR) in environment 510. In embodiments, the system (for example, personalization module 110) retrieves a plurality of augmented reality sub-animations for the reactive association(s) between the digital objects and the physical objects.

In embodiments, the system (for example, personalization module 110) includes one or more of the sub-animations in the AR animation to show the reactive association(s) between the digital objects (personalized and others) and the physical object.

In embodiments, when a user is within a predetermined proximity to a physical object, the system (for example, personalization module 110) plays on AR headset 505 the AR animation of the activity associated with that physical object. In embodiments, playing the AR animation includes starting the activity by, for example, presenting one or more digital objects (personalized or otherwise) to the user to teach the user the relationships between the digital objects (personalized or otherwise) and the physical object. In embodiments, the system (for example, personalization module 110) monitors the user's actions and the user's reactions to the digital objects in order to determine whether the user is associating the digital object with the physical object. As a result of the user associating the digital object (personalized or otherwise) with the physical object, the system shows the associated sub-animation in environment 510 through AR headset 505.

In embodiments, personalization module 110 performs the functions shown in chart 550 in FIG. 5, as discussed above. Also shown in FIG. 5 is a user 501 wearing an AR headset (such as, for example, AR headset 505) and using physical objects (real world tools 530) in an AR activity that includes a virtual view 535. User 501 is a new user of the system that benefits from a portion of the feedback provided by user 500 while using the system. For example, personalization module 110 shows to user 501 personalized digital objects that have been personalized for user 500 as a result of user 501 and user 500 sharing common interests, occupations, hobbies, etc. In this way, the system tailors the selection of personalizations of the objects presented in user 501 in an attempt to increase the probability that user 501 will use the digit objects in an AR animation presented to user 501.

Figure 6:
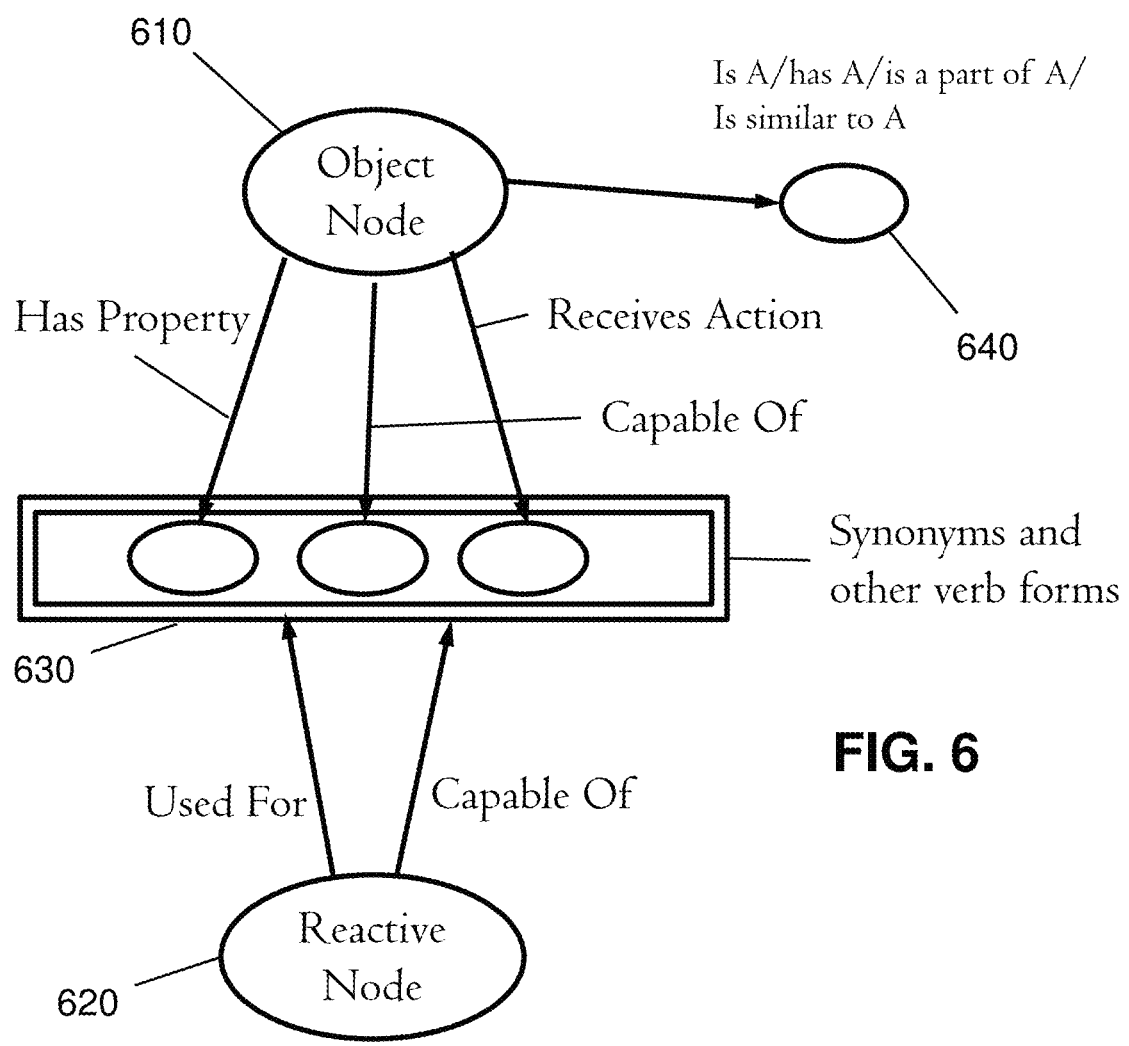
FIG. 6 shows AR animation discovery in accordance with aspects of the invention.

FIG. 6 shows one example of a machine learning algorithm for discovering the digital objects that have the reactive associations (described with respect to FIG. 5) with the physical object and AR animations based on the relationships between a digital object and a physical object. In FIG. 6, a physical object is represented by object node 610 and a digital object is represented by reactive node 620. In embodiments, the system (for example, personalization module 110) finds one or more synonyms and/or other verb forms 630 (for example, in database 545, storage device 120 and/or external storage device 400) associated with object node 610 and reactive node 620. Examples of synonyms and/or other verb forms 630 include "has property", "capable of", "receives action", and "used for". Other digital objects are represented by node 640. For example, the system (for example, personalization module 110) identifies a (or multiple) digital object that is: the same as the physical object represented by object node 610 ("is A"); includes the physical object represented by object node 610 ("has A"); "is part of" the physical object represented by object node 610; or "is similar to" the physical object represented by object node 610. In embodiments, these other digital objects are used by personalization module 110 in the same way as digital objects represented by reactive node 620.

Figures 7, 8:
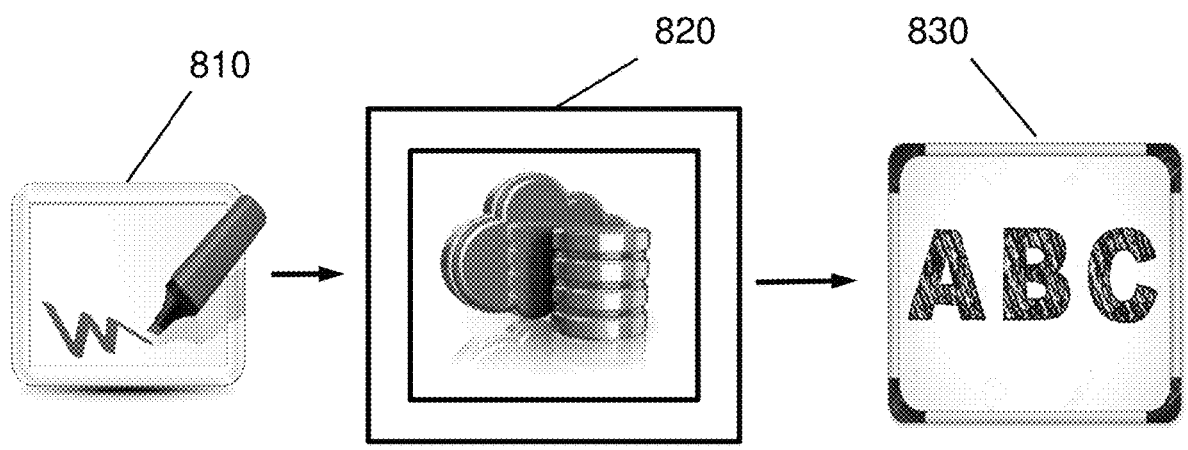
FIG. 7 shows a table of AR animation relationships of an exemplary method in accordance with aspects of the invention.
FIG. 8 shows a progression related to an exemplary method in accordance with aspects of the invention.

FIG. 7 is a chart 700 that shows exemplary results from the algorithm shown in FIG. 6. Chart 700 shows that reactive node "remote" is associated with object node "TV" and that an AR animation (a sub-animation described with respect to FIG. 5) that is related to "remote" and "TV" is a TV playing content. As an example, this animation is shown when a user picks up a remote (a digit object) and points it at a TV (a physical object). The result would be, for example, a digital image being shown and changed on the physical TV when the user pushes the correct buttons on the digital remote. In this manner, the user gains knowledge regarding the remote.

FIG. 8 illustrates an algorithm for bridging physical and digital space based on observations made by the system with regard to the user's reactions to physical objects and digital objects. In this example, the system recognizes that a user (such as, for example, user 500) has learned how to use a marker on a writing board (at step 810). The system updates a learner model for this user with the information that the user knows how to use a marker on a writing board (at step 820). In the future, when the user is near a writing board (such as, for example, writing board 525), the system enhances the use case (in this case using a marker on a writing board) by asking the user to write words on the writing board (at step 830). Through this procedure, the system improves the teaching quality by continually updating the particular user's knowledge base and suggesting increasingly more involved activities to the user. The system uses the updated data in subsequent uses of the system by the user to develop activities that are suited to the user's knowledge level. For example, after the user has been taught by the system how to use a marker to write on a writing board, and a database (for example database 545) is updated to reflect this level of learning, the system presents to the user the activity of drawing a flow chart on the writing board with the marker (such as, for example, digital marker 529). The subsequent presentation can be either during the user's current session using the system, or it can be a separate session in the future.

In embodiments, such as, for example, the embodiment shown in FIG. 5, personalization module 110 includes a GAN model that has a discriminator network D and a generator network G for a given user 500 wearing AR headset 505 in environment 510. AR headset 505 has a camera for gaze tracking and identifying objects of interest via image recognition such as, for example, a convolutional neural network (CNN) stored in a cloud database (such as, for example database 545). The system identifies and labels a physical object 0 (such as, for example, window 520) using, for example, an encoder-decoder model for determining if the user is paying attention to a particular object 0. An image of the physical object 0 along with its label (received from a CNN, for example) is fed into the discriminator network of the GAN. Using reactive AR, explained above, a digit object (such as, for example, blind 523) is created via the generative network of the GAN. The system monitors the user's reactions to the created digital object over small fractions of time T which act as the agent state (for the GAN) at a given time as part of a reinforcement learning model. Using sentiment analysis on the reactions, if the user's reactions generate a negative sentiment scoring, a reward function is updated with −x wherein x can be configured or learned over time based on user heuristics. In embodiments, if the user's sentiment scoring is positive, for example greater than +0.5, a positive reward function is generated with a value of +y.

In the case of a negative reward function value, the feedback to the reactive learning model is fed into the generator network of the GAN to create a different image that has reactive association with the identified physical object P in the environment E. In the case of a positive reward function value, the generator network of the GAN is perfected over time to result in consistent positive rewards and lead to minimum tweaking in the generated image.

Embodiments transfer learning across similar physical spaces based on learning from one space (such as, for example, environment 510). The system collects and keys attributes learned for personalized reactive association learning with properties of the physical space. In embodiments, the system similarly learns from a user profile and collects and keys attributes learned for personalized reactive association learning with properties of the user. Then, based on similarities, the system maps the discovered personalized attributes to similar physical spaces and similar user profiles. For example, if environment 510 is a classroom, then the system maps the discovered personalized attribute of user 500 preferring a red marker 529 for a light blue writing board 525 to other users that are in the presence of a light blue writing board in a classroom. In another example, if user 500 is a lab technician, then the system maps the discovered personalized attributes of user 500 to other lab technicians, regardless of the environment.

Figure 9:
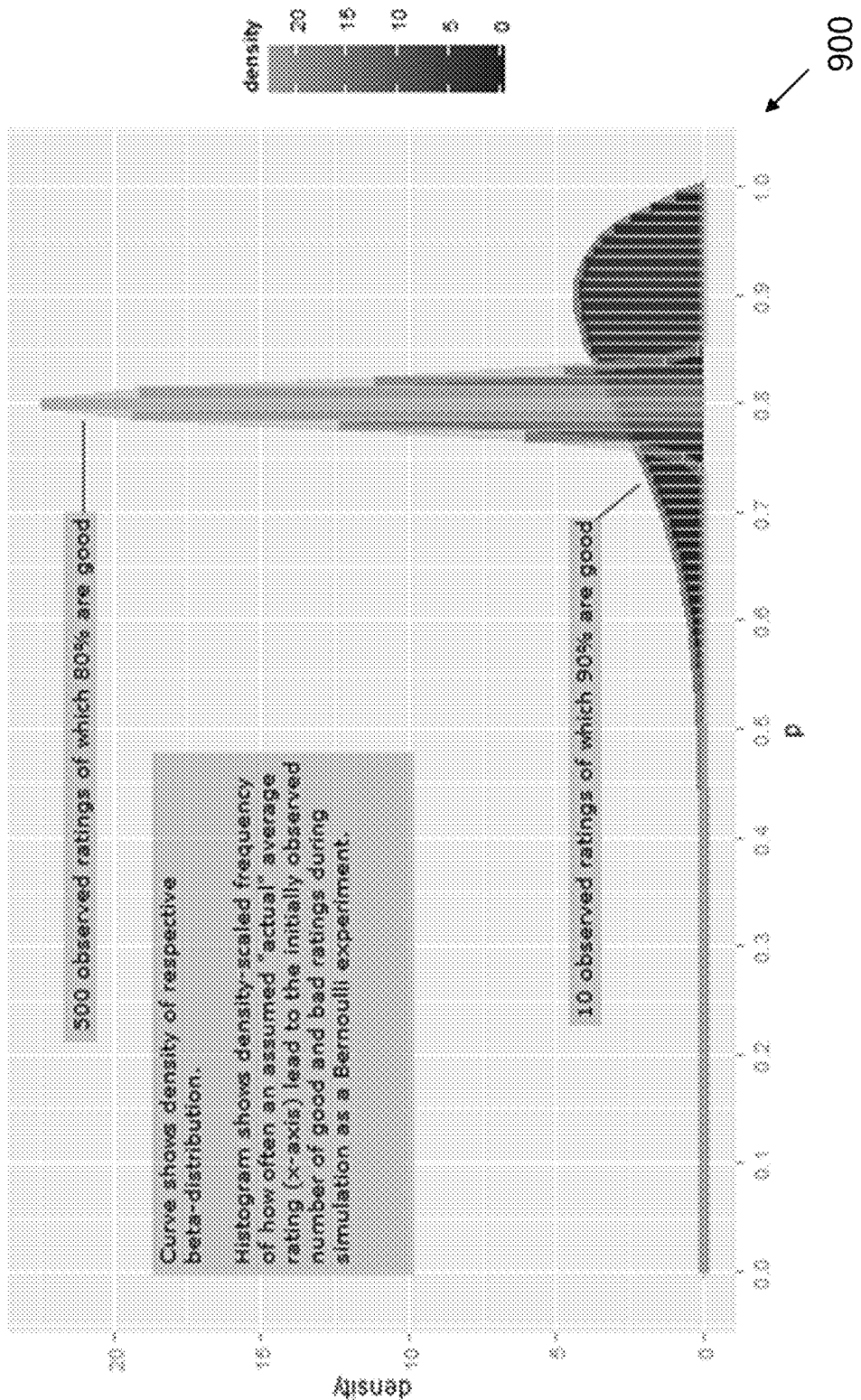
FIG. 9 shows a chart related to a system algorithm in accordance with aspects of the invention.

FIG. 9 shows an example 900 of reinforcement adjustment by alternatives. In embodiments, users provide feedback regarding which alternative personalizations of a particular digit object they prefer. For example, digital marker 529 might have five alternatives regarding the color of marker 529. The system then compares the top two alternatives using a beta distribution as shown in FIG. 9. The alpha is the highest number of likes and beta is the highest number of dislikes for alternative 1. The alpha is the highest number of likes and beta is the highest number of dislikes for alternative 2. Probability density functions of alternatives 1 and 2 are comparable as shown in the following equations.

$$f(x; \alpha, \beta) = \text{constant} \cdot x^{\alpha-1}(1-x)^{\beta-1}$$

$$= \frac{x^{\alpha-1}(1-x)^{\beta-1}}{\int_0^1 u^{\alpha-1}(1-u)^{\beta-1}du}$$

$$= \frac{\Gamma(\alpha+\beta)}{\Gamma(\alpha)\Gamma(\beta)} x^{\alpha-1}(1-x)^{\beta-1}$$

$$= \frac{1}{B(\alpha, \beta)} x^{\alpha-1}(1-x)^{\beta-1}$$

The system selects a confidence level based on the AR complexity (geometrically) that is greater than a confidence level of a deep neural network (DNN) with geometry outputs. The ratio of the area under the curve for the 90% good experience+the ratio of the area under the curve for 10% bad experience provides a reward metric for reinforcement learning Q Table. The numerator of the ratio is the target alternative for adjustment.

Figure 10:
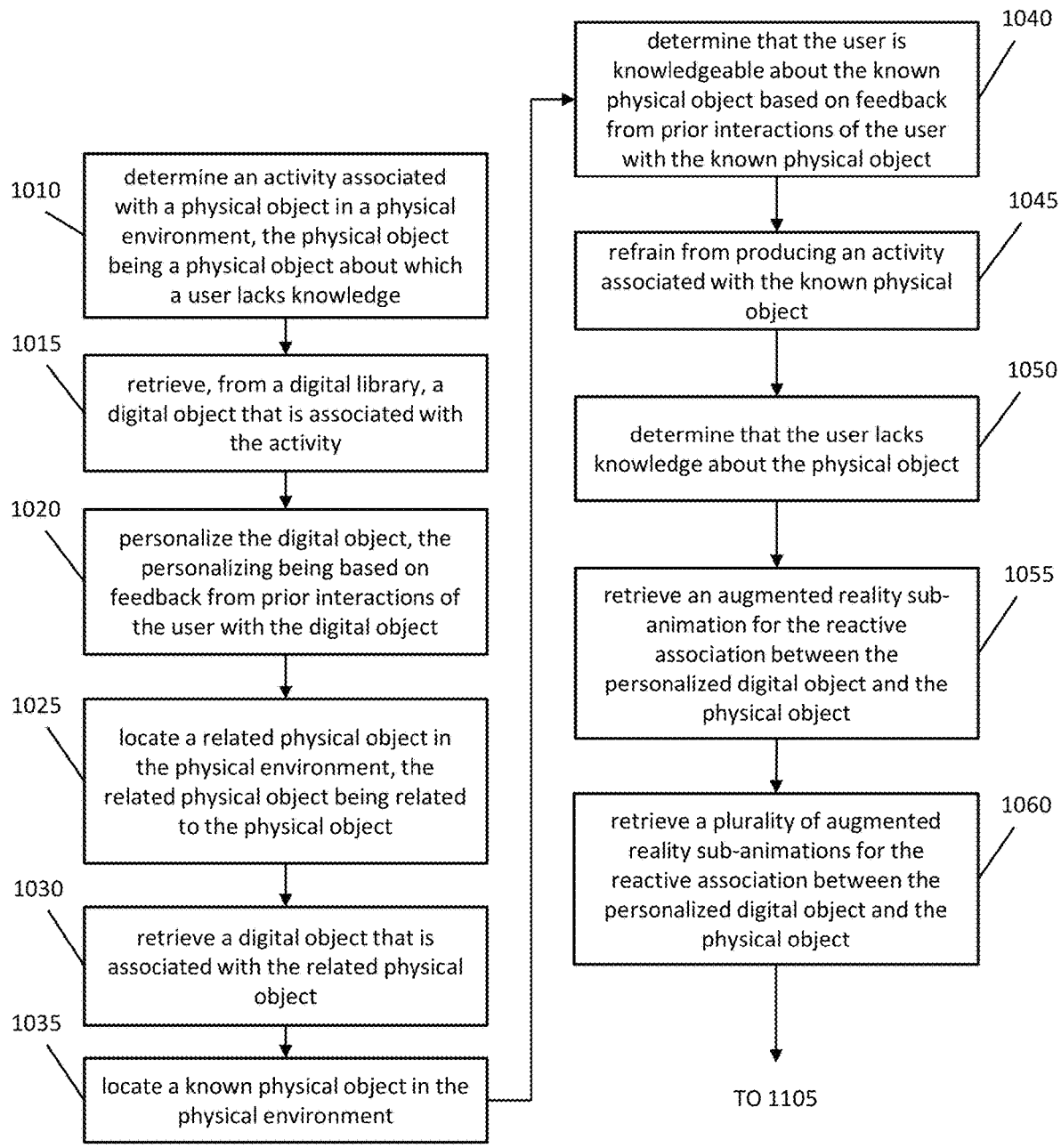
FIG. 10 shows a flow chart of an exemplary method in accordance with aspects of the invention.
Figure 11:
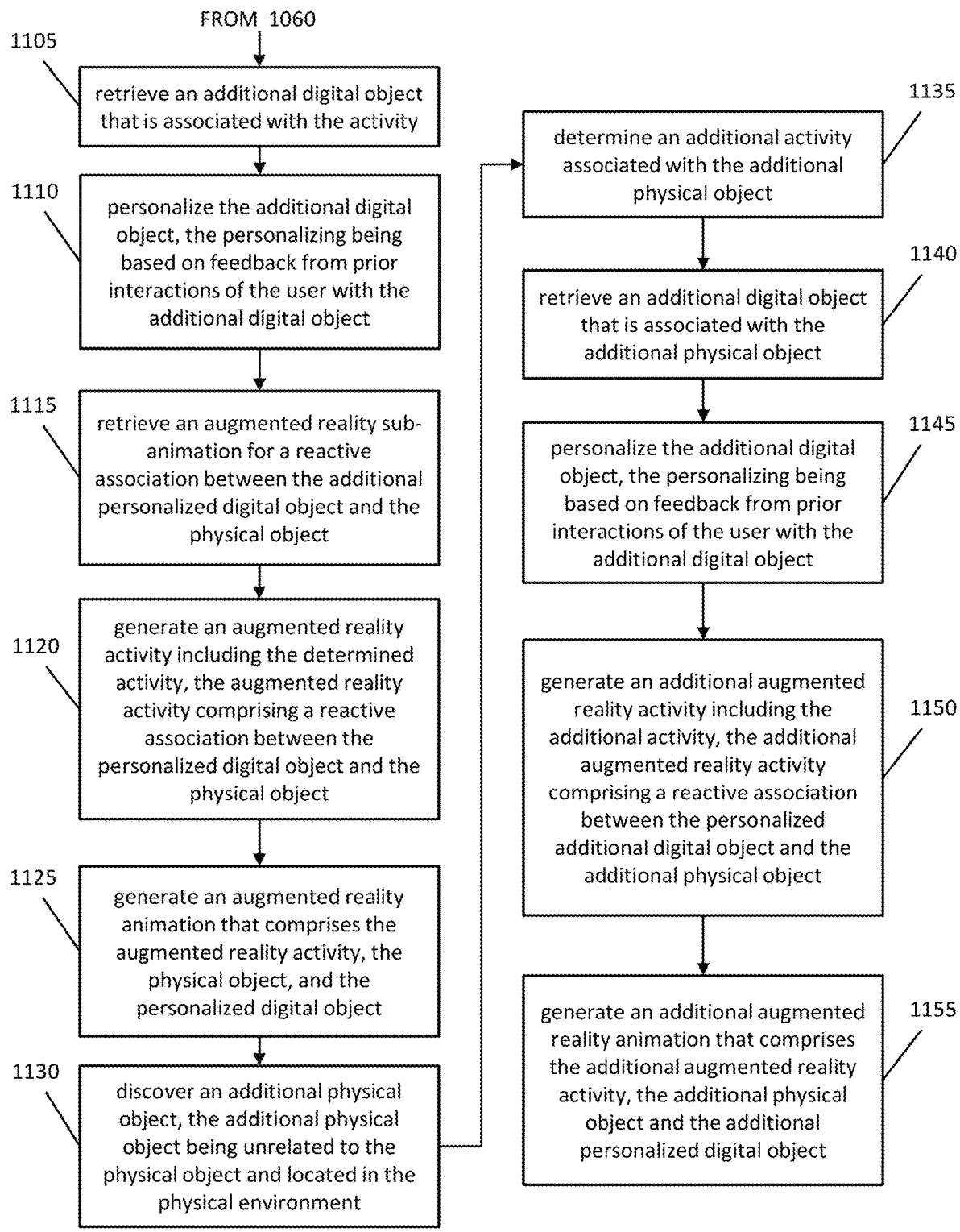
FIG. 11 shows a flow chart of an exemplary method in accordance with aspects of the invention.

FIGS. 10 and 11 show a flowchart of an exemplary method in accordance with aspects of the present invention. Steps of the method may be carried out in the environments of FIGS. 4 and 5 and are described with reference to elements depicted in FIGS. 4 and 5.

At step 1010, the system determines an activity associated with a physical object in a physical environment, the physical object being a physical object about which a user lacks knowledge. In embodiments, and as described with respect to FIGS. 4 and 5, personalization module 110 determines an activity associated with a physical object in physical environment 510 by accessing a library of activity/object relationships. In this example, personalization module 110 determines an activity associated with writing board 525 by accessing a library of activity/object relationships in database 545 stored in storage device 120. In this example, the determined activity is writing on a piece of paper attached to writing board 545.

At step 1015, the system retrieves, from a digital library, a digital object that is associated with the activity. In embodiments, and as described with respect to FIGS. 4 and 5, personalization module 110 retrieves, from storage device 120, data defining the digital object that is associated with the activity. In this example, the digital object is paper 528 that is determined by accessing the library of activity/object relationships in database 545 stored in storage device 120.

At step 1020, the system personalizes the digital object, the personalizing being based on feedback from prior interactions of the user with the digital object. In embodiments, and as described with respect to FIGS. 4 and 5, personalization module 110 personalizes the digital object based on feedback from prior interactions of the user with the digital object. In this example, personalization module 110 personalizes paper 528, the personalizing being based on feedback from prior interactions of user 500 with paper 528. For example, user 500 has, in a prior interaction with paper 528, chosen a light blue color for paper 528. As a result, personalization module 110 personalizes paper 528 for user 500 by making it appear light blue in color.

At step 1025, the system locates a related physical object in the physical environment, the related physical object being related to the physical object. In embodiments, and as described with respect to FIGS. 4 and 5, personalization module 110 locates a related physical object in the physical environment, the related physical object being related to the physical object. In this example, personalization module 110 locates window 520 in physical environment 510, window 520 being related to writing board 525 because the amount of light entering physical environment 510 can influence how writing board 525 and markings on writing board 525 appear.

At step 1030, the system retrieves a digital object that is associated with the related physical object. In embodiments, and as described with respect to FIGS. 4 and 5, personalization module 110 retrieves a digital object that is associated with the related physical object. In this example, personalization module 110 retrieves, from database 545, window shade 523 that is associated with window 520.

At step 1035, the system locates a known physical object in the physical environment. In embodiments, and as described with respect to FIGS. 4 and 5, personalization module 110 locates a known physical object in the physical environment. In this example, personalization module 110 locates bench 515 in physical environment 510 though AR headset 505.

At step 1040, the system determines that the user is knowledgeable about the known physical object based on feedback from prior interactions of the user with the known physical object. In embodiments, and as described with respect to FIGS. 4 and 5, personalization module 110 determines that the user is knowledgeable about the known physical object based on feedback from prior interactions of the user with the known physical object. In this example, personalization module 110 determines that user 500 is knowledgeable about bench 515 based on feedback from prior interactions of user 500 with bench 515.

At step 1045, the system refrains from producing an activity associated with the known physical object. In embodiments, and as described with respect to FIGS. 4 and 5, personalization module 110 refrains from producing an activity associated with the known physical object. In this example, personalization module 110 refrains from producing an activity associated with bench 515.

At step 1050, the system determines that the user lacks knowledge about the physical object. In embodiments, and as described with respect to FIGS. 4 and 5, personalization module 110 determines that the user lacks knowledge about the physical object based on a lack of feedback from prior interactions of the user with the known physical object. In this example, personalization module 110 determines that user 500 lacks knowledge about writing board 525 based on a lack of feedback from prior interactions of the user with writing board 525.

At step 1055, the system retrieves an augmented reality sub-animation for the reactive association between the personalized digital object and the physical object. In embodiments, and as described with respect to FIGS. 4 and 5, personalization module 110 retrieves, from database 545, an augmented reality sub-animation for the reactive association between the personalized digital object and the physical object. In this example, personalization module 110 retrieves, from database 545, an augmented reality sub-animation for the reactive association between personalized paper 528 and writing board 525.

At step 1060, the system retrieves a plurality of augmented reality sub-animations for the reactive association between the personalized digital object and the physical object. In embodiments, and as described with respect to FIGS. 4 and 5, personalization module 110 retrieves, from database 545, a plurality of augmented reality sub-animations for the reactive association between the personalized digital object and the physical object. In this example, personalization module 110 retrieves, from database 545, a plurality of augmented reality sub-animations for the reactive association between personalized paper 528 and writing board 525.

At step 1105, the system retrieves an additional digital object that is associated with the activity. In embodiments, and as described with respect to FIGS. 4 and 5, personalization module 110 retrieves, from database 545, an additional digital object that is associated with the activity. In this example, personalization module 110 retrieves, from database 545, marker 529 that is associated with the activity.

At step 1110, the system personalizes the additional digital object, the personalizing being based on feedback from prior interactions of the user with the additional digital object. In embodiments, and as described with respect to FIGS. 4 and 5, personalization module 110 personalizes the additional digital object, the personalizing being based on feedback from prior interactions of the user with the additional digital object. In this example, personalization module 110 personalizes marker 529 to be red. The personalizing is based on feedback from prior interactions of user 500 with marker 529.

At step 1115, the system retrieves an augmented reality sub-animation for a reactive association between the additional personalized digital object and the physical object. In embodiments, and as described with respect to FIGS. 4 and 5, personalization module 110 retrieves, from database 545, an augmented reality sub-animation for a reactive association between the additional personalized digital object and the physical object. In this example, personalization module 110 retrieves, from database 545, an augmented reality sub-animation for a reactive association between marker 529 and writing board 525.

At step 1120, the system generates an augmented reality activity including the determined activity, the augmented reality activity comprising a reactive association between the personalized digital object and the physical object. In embodiments, and as described with respect to FIGS. 4 and 5, personalization module 110 generates an augmented reality activity including the determined activity, the augmented reality activity comprising a reactive association between the personalized digital object and the physical object. In this example, personalization module 110 generates an augmented reality activity including the determined activity, the augmented reality activity comprising a reactive association between personalized paper 528 and writing board 525.

At step 1125, the system generates an augmented reality animation that comprises the augmented reality activity, the physical object, and the personalized digital object. In embodiments, and as described with respect to FIGS. 4 and 5, personalization module 110 generates an augmented reality animation that comprises the augmented reality activity, the physical object, and the personalized digital object. In this example, personalization module 110 generates an augmented reality animation that comprises the augmented reality activity, writing board 525, and personalized paper 528.

At step 1130, the system discovers an additional physical object, the additional physical object being unrelated to the physical object and located in the physical environment. In embodiments, personalization module 110 discovers an additional physical object using one of the techniques described above for discovering a physical object, the additional physical object being unrelated to the physical object and located in the physical environment. In embodiments, personalization module 110 determines that the additional physical object is unrelated to the physical object by accessing a database of relationships between objects. In this example, personalization module 110 discovers wall calendar 560 by sensing the presence of IoT sensor 561 through AR headset 505 and communicating the presence of IoT sensor 561 to computer device 100 through wireless network 200. In this example, personalization module 110 determines that wall calendar 560 is unrelated to writing board 525 by accessing database 545 and finding no relationship between wall calendar 560 and writing board 525. Also, in this example, wall calendar 525 is located in physical environment 510.

At step 1135, the system determines an additional activity associated with the additional physical object. In embodiments, personalization module 110 determines an additional activity associated with the additional physical object by accessing a library of activity/object relationships. In this example, personalization module 110 determine an additional activity associated with wall calendar 560 by accessing a library of activity/object relationships in database 545 stored in storage device 120. In this example, an additional activity associated with wall calendar 560 is crossing completed projects off of wall calendar 560.

At step 1140, the system retrieves an additional digital object that is associated with the additional physical object. In embodiments, personalization module 110 retrieves an additional digital object that is associated with the additional physical object. For example, personalization module 110 retrieves, from a digital library, a digital sticker 561 that is associated with wall calendar 560. The digital library includes the association relationship between various physical objects and various digital objects. In this example, a digital library in database 545 stored in storage device 120 includes the association relationship between wall calendar 560 and digital sticker 561.

At step 1145, the system personalizes the additional digital object, the personalizing being based on feedback from prior interactions of the user with the additional digital object. In embodiments, personalization module 110 personalizes the additional digital object, the personalizing being based on feedback from prior interactions of the user with the additional digital object. In this example, personalization module 110 personalizes digital sticker 561. The personalizing is based on feedback from prior interactions of user 500 with digital sticker 561. For example, user 500 indicated in a prior interaction with digital sticker 561 that user 500 prefers digital sticker 561 to be gold.

At step 1150, the system generates an additional augmented reality activity including the additional activity, the additional augmented reality activity comprising a reactive association between the personalized additional digital object and the additional physical object. In embodiments, personalization module 110 generates an additional augmented reality activity including the additional activity, the additional augmented reality activity comprising a reactive association between the personalized additional digital object and the additional physical object. For example, the personalized additional digital object that is associated with the additional physical object is (through AR) overlaid on top of the additional physical object. Also, in embodiments, the personalized additional digital object that is associated with the additional physical object is randomly positioned (through AR) in environment 510. In this example, personalization module 110 generates an additional augmented reality activity including the additional activity, the additional augmented reality activity comprising a reactive association between personalized digital sticker 561 and wall calendar 560.

At step 1155, the system generates an additional augmented reality animation that comprises the additional augmented reality activity, the additional physical object and the additional personalized digital object. In embodiments, and as described with respect to FIGS. 4 and 5, personalization module 110 generates an additional augmented reality animation that comprises the additional augmented reality activity, the additional physical object and the additional personalized digital object. In this example, personalization module 110 generates an additional augmented reality animation that comprises the additional augmented reality activity, wall calendar 560 and personalized digital sticker 561. An example of the additional augmented reality activity is placing personalized digital sticker 561 on wall calendar 560 on days that pizza is served in the cafeteria.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, by a computer device, an activity associated with a physical object in a physical environment, the physical object being a physical object about which a user lacks knowledge;
   retrieving, by the computing device and from a digital library, a digital object that is associated with the activity;
   personalizing, by the computing device, the digital object, the personalizing being based on feedback from prior interactions of the user with the digital object;
   generating, by the computing device, an augmented reality activity including the determined activity, the augmented reality activity comprising a reactive association between the personalized digital object and the physical object; and
   generating, by the computing device, an augmented reality animation that comprises the augmented reality activity, the physical object, and the personalized digital object.

2. The method of claim 1, further comprising locating, by the computing device, a known physical object in the physical environment;
   determining, by the computing device, that the user is knowledgeable about the known physical object based on feedback from prior interactions of the user with the known physical object; and
   refraining, by the computing device, from producing an activity associated with the known physical object.

3. The method of claim 1, further comprising locating, by the computing device, a related physical object in the physical environment, the related physical object being related to the physical object.

4. The method of claim 3, further comprising retrieving, by the computing device, a digital object that is associated with the related physical object.

5. The method of claim 1, further comprising determining that the user lacks knowledge about the physical object.

6. The method of claim 1, wherein the activity is teaching the user about the physical object.

7. The method of claim 1, further comprising retrieving, by the computing device, an augmented reality sub-animation for the reactive association between the personalized digital object and the physical object.

8. The method of claim 7, further comprising retrieving, by the computing device, a plurality of augmented reality sub-animations for the reactive association between the personalized digital object and the physical object.

9. The method of claim 1, further comprising retrieving, by the computing device, an additional digital object that is associated with the activity; and
   personalizing, by the computing device, the additional digital object, the personalizing being based on feedback from prior interactions of the user with the additional digital object.

10. The method of claim 9, further comprising retrieving, by the computing device, an augmented reality sub-animation for a reactive association between the additional personalized digital object and the physical object.

11. The method of claim 1, further comprising discovering, by the computing device, an additional physical object, the additional physical object being unrelated to the physical object and located in the physical environment.

12. The method of claim 11, further comprising:
    determining, by the computing device, an additional activity associated with the additional physical object; and
    retrieving, by the computing device, an additional digital object that is associated with the additional physical object.

13. The method of claim 12, further comprising:
    personalizing, by the computing device, the additional digital object, the personalizing being based on feedback from prior interactions of the user with the additional digital object;
    generating, by the computing device, an additional augmented reality activity including the additional activity, the additional augmented reality activity comprising a reactive association between the personalized additional digital object and the additional physical object; and
    generating, by the computing device, an additional augmented reality animation that comprises the additional augmented reality activity, the additional physical object and the additional personalized digital object.

14. The method of claim 1, wherein the computing device includes software provided as a service in a cloud environment.

15. A computer program product comprising one or more computer readable storage media having program instructions collectively stored on the one or more computer readable storage media, the program instructions executable to:
    determine an activity associated with a physical object in a physical environment, the physical object being a physical object about which a user lacks knowledge;
    retrieve, from a digital library, a digital object that is associated with the activity;
    personalize the digital object, the personalizing being based on feedback from prior interactions of the user with the digital object;
    generate an augmented reality activity including the determined activity, the augmented reality activity comprising a reactive association between the personalized digital object and the physical object; and
    generate an augmented reality animation that comprises the augmented reality activity, the physical object, and the personalized digital object.

16. The computer program product of claim 15, wherein the program instructions are further executable to:
    retrieve an additional digital object that is associated with the activity; and
    personalize the additional digital object, the personalizing being based on feedback from prior interactions of the user with the additional digital object.

17. The computer program product of claim 16, wherein the program instructions are further executable to retrieve an augmented reality sub-animation for a reactive association between the additional personalized digital object and the physical object.

18. A system comprising:
    a processor, a computer readable memory, one or more computer readable storage media, and program instructions collectively stored on the one or more computer readable storage media, the program instructions executable to:
    determine an activity associated with a physical object in a physical environment, the physical object being a physical object about which a user lacks knowledge;

retrieve, from a digital library, a digital object that is associated with the activity;

personalize the digital object, the personalizing being based on feedback from prior interactions of the user with the digital object;

generate an augmented reality activity including the determined activity, the augmented reality activity comprising a reactive association between the personalized digital object and the physical object; and generate an augmented reality animation that comprises the augmented reality activity, the physical object, and the personalized digital object.

19. The system of claim 18, wherein the program instructions are further executable to retrieve an augmented reality sub-animation for the reactive association between the personalized digital object and the physical object.

20. The system of claim 19, wherein the program instructions are further executable to retrieve a plurality of augmented reality sub-animations for the reactive association between the personalized digital object and the physical object.

* * * * *